April 3, 1945.  J. K. JACKSON  2,372,898
GLASS TEMPERING APPARATUS
Filed Jan. 11, 1940   8 Sheets-Sheet 1

INVENTOR.
JOHN K. JACKSON
BY
ATTORNEY.

April 3, 1945. J. K. JACKSON 2,372,898
GLASS TEMPERING APPARATUS
Filed Jan. 11, 1940 8 Sheets-Sheet 6

INVENTOR.
JOHN K. JACKSON
BY
ATTORNEY.

April 3, 1945.   J. K. JACKSON   2,372,898
GLASS TEMPERING APPARATUS
Filed Jan. 11, 1940   8 Sheets-Sheet 7

INVENTOR.
JOHN K. JACKSON
BY
ATTORNEY.

April 3, 1945.　　　　J. K. JACKSON　　　　2,372,898
GLASS TEMPERING APPARATUS
Filed Jan. 11, 1940　　　　8 Sheets-Sheet 8

INVENTOR.
JOHN K. JACKSON
BY
ATTORNEY.

Patented Apr. 3, 1945

2,372,898

UNITED STATES PATENT OFFICE 2,372,898

GLASS TEMPERING APPARATUS

John K. Jackson, Corning, N. Y., assignor to Corning Glass Works, Corning, N. Y., a corporation of New York Application January 11, 1940, Serial No. 313,457

2 Claims. (Cl. 49—45)

The present invention relates to the art of tempering and particularly to improvements in methods of and apparatus for tempering glassware.

Patent No. 2,231,811 to Jesse T. Littleton et al., describes one form of apparatus adapted to receive ware immediately after its formation, to heat such ware to an equalized temperature throughout its mass and to thereafter successively pass the ware through a chilling bath, through a tunnel in which air blasts further cool the ware, and then through a wash bath. This patent cites specific molten salts and salt mixtures suitable for use as heating baths and also teaches the use of baths at lower temperatures for chilling or tempering ware, which has previously been heated to a given temperature, to produce a desired degree of temper in the ware.

An object of the present invention is an improved tempering method.

Another object is an improved form of apparatus for carrying out applicant's improved tempering method.

A further object is an apparatus capable of the receipt, further heating and processing or tempering of articles of ware directly from a line of production and also capable of processing or tempering articles of ware delivered to it at room temperature.

A still further object of the invention is the maintenance of the temperature of the chilling and temperature reducing fluids or baths at a predetermined constant value in spite of the fact that such fluids constantly absorb heat from ware passed through them.

The invention embodies a structure having ware heating, chilling, temperature reducing, and shock and wash tanks of fluid baths arranged end to end in the order named, a kiln arranged over the series of tanks for heating ware taken from stock, finger equipped chains for the receipt and delivery of ware to the heating kiln, finger equipped chains for conveying ware through the kiln, finger equipped chains for the receipt of ware directly from a line of production or alternatively for ware as it leaves the kiln for delivery to finger equipped chains for conveying the ware through the respective tanks in succession, and of devices for transferring ware from one tank or fluid bath to another.

The feature of construction whereby cooling of the ware temperature reducing fluid is effected comprises a perforated tube immersed in such fluid and supplied with cooling air.

Other objects and features of the invention will become evident from a further perusal of the specification taken in connection with the accompanying drawings wherein.

In brief, the arrangement of the apparatus is such that ware from stock is placed in a suitable rack suspended from a ware supporting rod which is being carried toward the heating kiln by fingers of conveyor chains at one end of the apparatus. At the entrance of the kiln, fingers of other chains take over the rod and pass the ware through the kiln. At the exit end of the kiln, fingers of a third set of chains lower the ware into the heating bath. Other chains then pass the ware through this bath and successively through the chilling, temperature reducing, and shock and wash baths, after which the ware is picked up by the chains which conveyed it to the heating kiln and which now raise the ware from the latter bath. An attendant at this location removes the treated ware from the ware rack and replaces it with a fresh piece.

When treated directly from a press, it is unnecessary to pass ware through the kiln. Accordingly, in such case the ware is placed in a ware rack having its supporting rod on fingers of those chains being carried from the exit end of the kiln toward the heating bath rather than in a rack about to enter the kiln. Other steps in the treatment of the ware are the same as for ware taken from stock.

Figure 5:
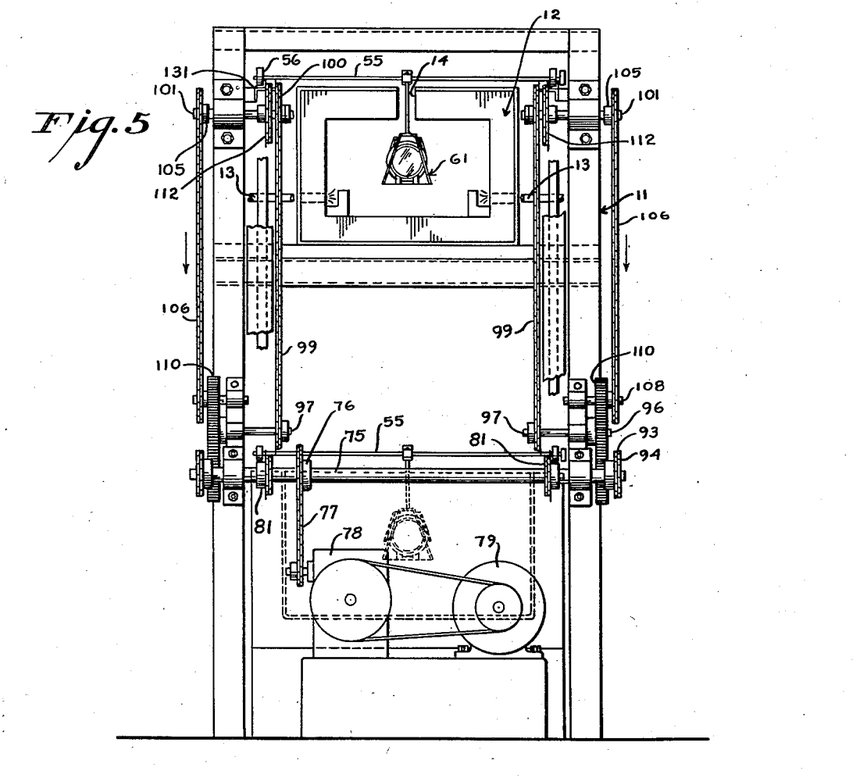
Fig. 5 is an end elevation of the apparatus.
Figure 5A:
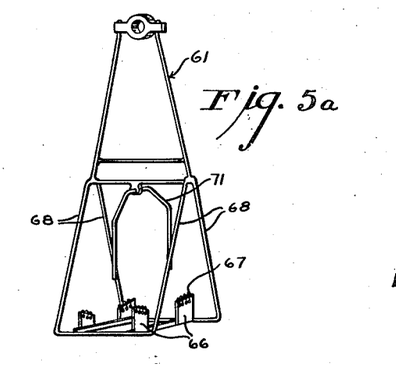
Fig. 5a is an enlarged perspective view of a form of ware rack shown in use with the apparatus in Figs. 5, 6, 7 and 9.
Figures 6, 6A:
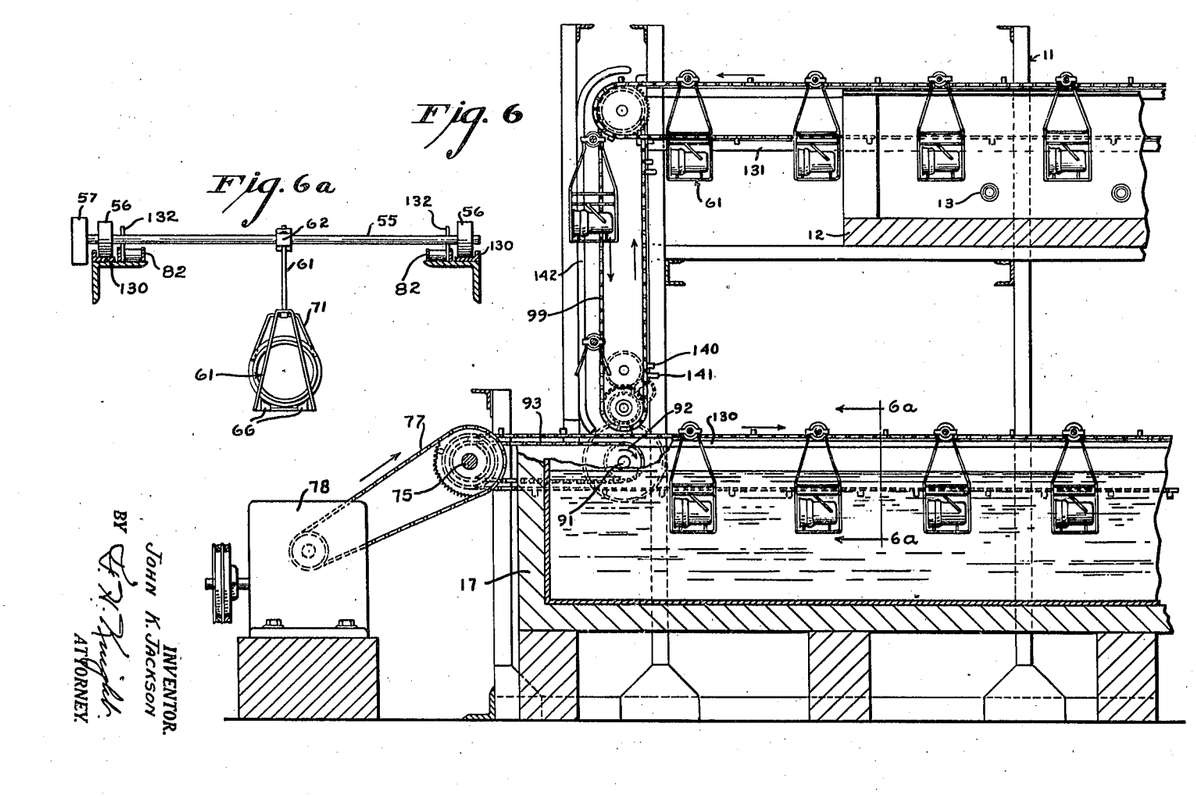
Fig. 6 is an enlarged sectional elevation of a portion of the apparatus illustrated in Fig. 1, and in addition illustrates racks conveying ware in the course of its processing or tempering treatment.
Fig. 6a is an enlarged view taken on line 6a—6a of Fig. 6, showing the arrangement of an article rack supporting rod with respect to the associated conveying chains.
Figure 7:
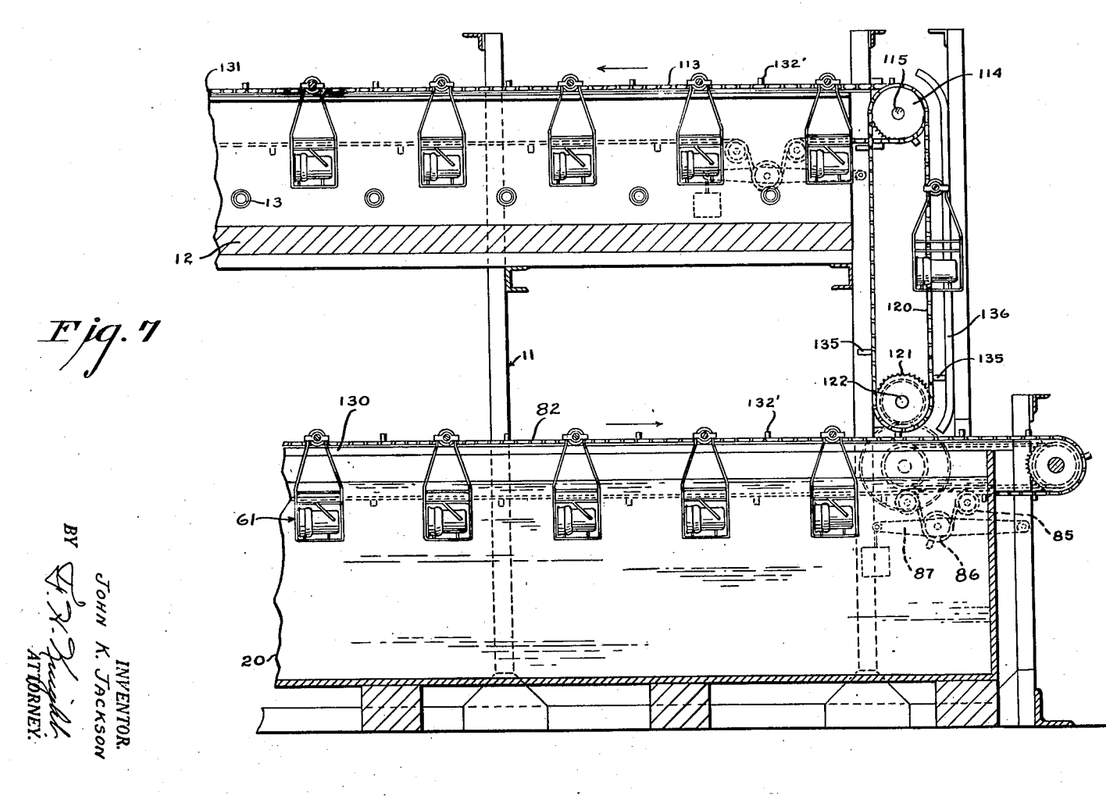
Fig. 7 is a view similar to Fig. 6 but of a portion of the apparatus illustrated in Fig. 2.

The entire apparatus is supported by a suitable frame generally designated 11 and within the upper portion of which, as best illustrated in Figs. 5, 6 and 7, is a tunnel kiln, generally designated 12, heated by a series of gas burners 13 arranged on either side thereof. A slot 14 (Figs. 1, 2 and 5) through the kiln roof extends the full length thereof and enables ware suspended from above the kiln to be passed therethrough. Arranged below the kiln in end to end relation are tanks 17, 18, 19 and 20 for ware heating, primary chilling, ware temperature reducing, and shock and wash bath fluids, respectively.

Heating elements 22 (Fig. 1) are supplied with electric current in known manner to heat the material forming the fluid bath in tank 17 to a temperature determined by the softening temperature of the ware.

The materials forming the fluids contained in tanks 18 and 19 are heated by gas burners 25 which direct their heating flames into suitable burner ports in housings surrounding these tanks.

During operation, heat imparted to the fluid in tanks 18 and 19 by the ware alone tends to maintain these fluids heated to above their desired operating temperatures. However, fluid cooling equipment functions with sufficient effectiveness to cool these fluids to slightly below their desired predetermined temperatures, thereby enabling the desired temperatures to be maintained by placing burners 25 under control of suitable temperature control apparatus, not shown, also having control over the burners 13 and the heating elements 22.

The fluid cooling equipment associated with tank 19 (Fig. 2) comprises a preformed pipe 26 arranged within the tank and connected with an external line 27 through which the proper amount of cooling air is supplied to make a limited use of the associated burners 25 necessary to maintain the temperature desired.

Ware supports

Figures 8, 8A, 8B, 9, 10, 11:
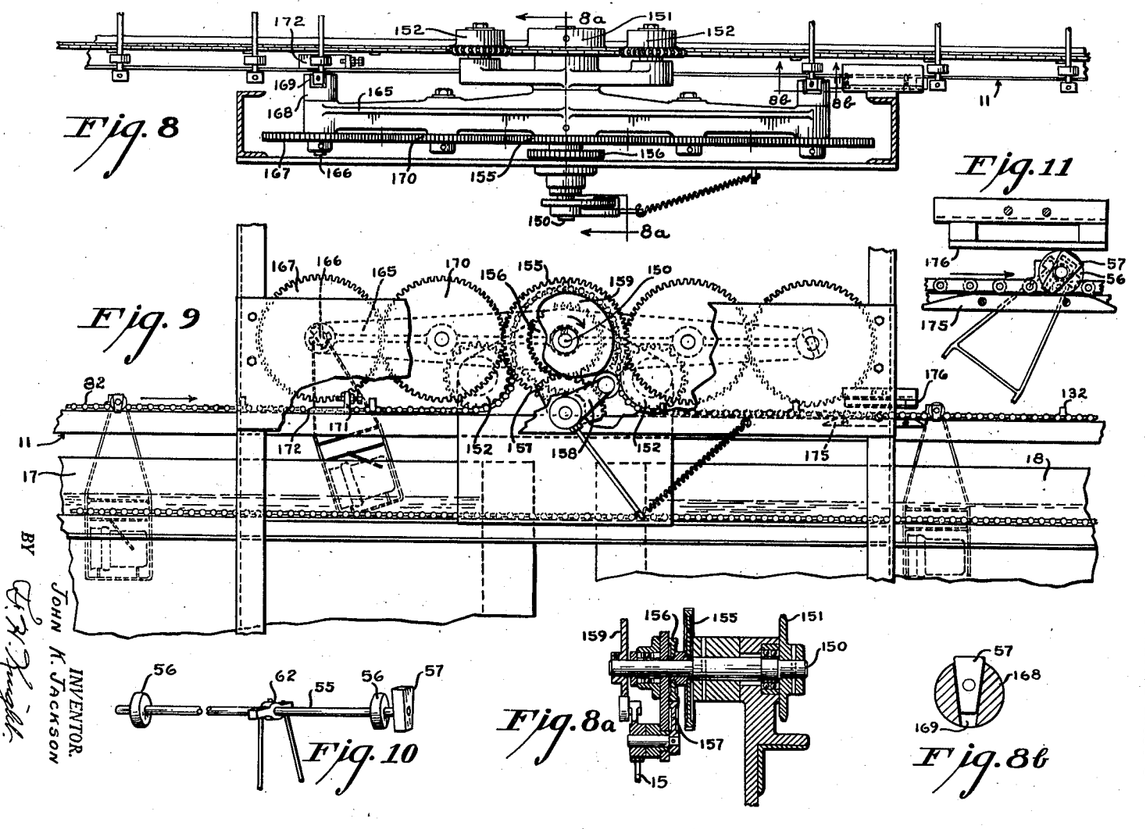
Fig. 8 is a plan view of a fragment of the apparatus containing one of the devices for transferring ware from one tank to another.
Fig. 8a is a view taken on line 8a—8a of Fig. 8.
Fig. 8b is a view taken on line 8b—8b of Fig. 8.
Fig. 9 is a side elevational view of Fig. 8.
Fig. 10 is a perspective view of an article rack carrying rod showing the rack properly broken away.
Fig. 11 is an enlarged fragmentary view of the apparatus of Figs. 8 and 9 which for a time prevents swinging of ware to an alternative position under the influence of gravity.

The individual supports provided for conveying each piece of ware through the kiln and the respective baths each comprises a rod 55, best shown in Figs. 6a and 10, with a roller 56 near each end and having on one of its extreme ends a key member 57 in fixed relation to the rod. A ware rack, of a configuration depending on the character of ware to be tempered, is tightly clamped to the rod 55 midway between its rollers 56. Each rack is provided at the top with a block 62 perforated to receive a ware support rod 55. It is desirable to expose the maximum possible surface of the ware to the fluids of the respective baths and accordingly the racks, such as 60 (Fig. 17) designed for support of a sauce pan 69 and similar ware of varying sizes, have inclined perforated sheet metal supports 63 having nichrome wire coiled through the perforations therethrough and only the upper portions of each coil turn engaged by the side-wall of a sauce pan while only its open edges engage upright rod members 65 of the frame. With this form of support the weight of the ware is so distributed that objectional marking of the ware where it contacts the supporting wires is avoided. This supporting engagement also has negligible heat capacity and therefore does not materially interfere with the cooling of the ware by the fluid at the supporting points.

Racks generally designated 61 designed for deep and relatively straight walled ware, such as shown in Figs. 5, 5a, 6 and 7, have four sheet metal supports 66 perforated along their upper edges and wire 67 wound thereover and through such perforations. The ware rests on the respective turns of wire and may or may not lightly contact the front and back rods 68 of the rack during treatment. An inverted U-shaped rod 71 is pivoted through a cross member of rack 61 and lightly engages opposite sides of the ware to assist in holding it in the rack.

Conveyors

Figure 1:
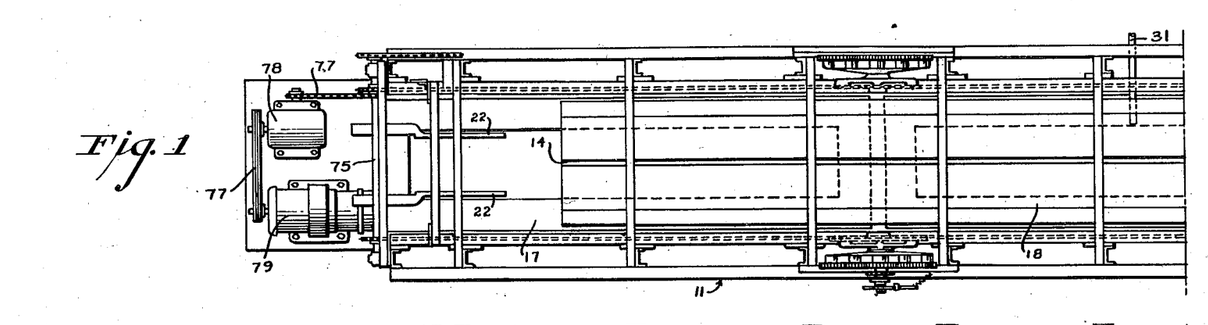
Figs. 1 and 2 together constitute a plan view of an apparatus embodying the invention.
Figure 2:
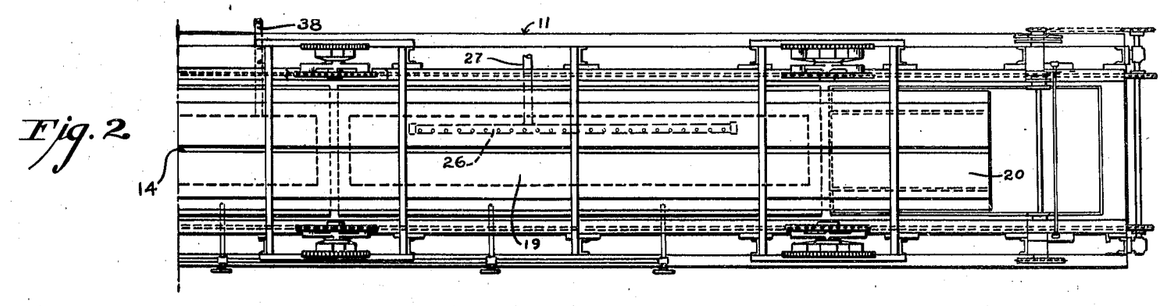
Figure 3:
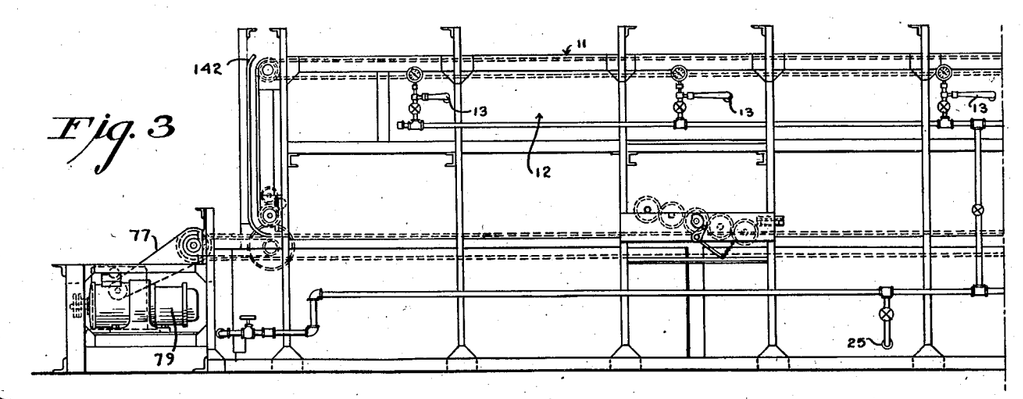
Figs. 3 and 4 comprise a side elevation of the apparatus.
Figure 4:
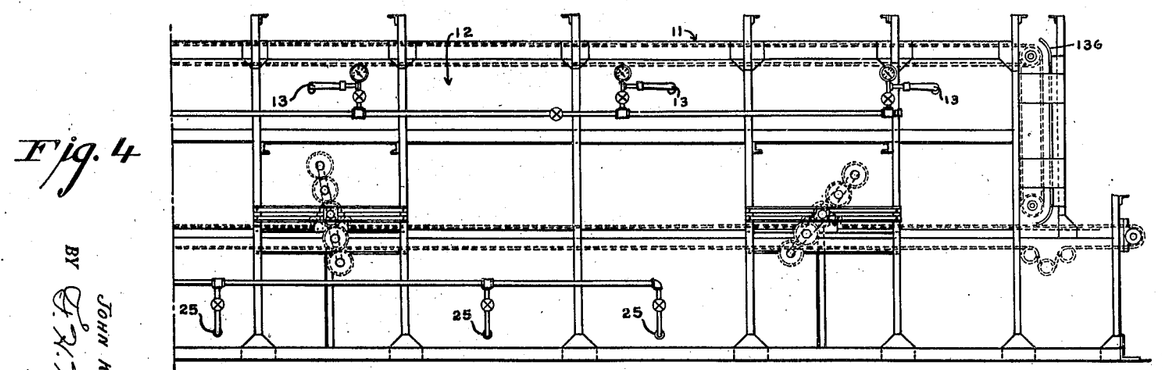

As is evident from an inspection of Figs. 5, 6, 7, and 12–14, the various conveyor chains are directly or indirectly driven by a cross shaft 75 carrying a sprocket wheel 76 driven by a chain 77 extending from a suitable gear reduction unit 78 driven by an associated motor 79 (Figs. 1 and 3). The shaft 75 at locations just within its bearing supports is provided with sprocket wheels 81 about which pass chains 82 extending to the opposite end of the structure where they pass around sprocket wheels 83 carried by stub shafts 84. Near the right hand end of the structure (Fig. 7) the lower run of chain 82 passes over idler sprocket wheels 85 and under an intermediate slack take-up sprocket wheel 86 carried by a weighted arm 87 which holds the chain taut.

On opposite sides of the machine stub shafts 91 (Figs. 6 and 12) are rotated by sprocket wheels 92 driven by chains 93 surrounding sprocket wheels 94 carried by the cross shaft 75 and through the medium of associated gears 95 and pinions 96 drive stub shafts 97 carrying sprocket wheels 98 for driving vertically disposed conveyor chains 99 which, near the top of the machine, pass around idler sprocket wheels 100 carried by stub shafts 101. These shafts are rotated by sprocket wheels 105 driven by chains 106 passing around sprocket wheels 107 carried by countershafts 108. These countershafts carry gears 110 driven by pinions 111 which are in mesh with the rotating pinions 96 carried by stub shafts 97.

Figures 12, 13, 14:
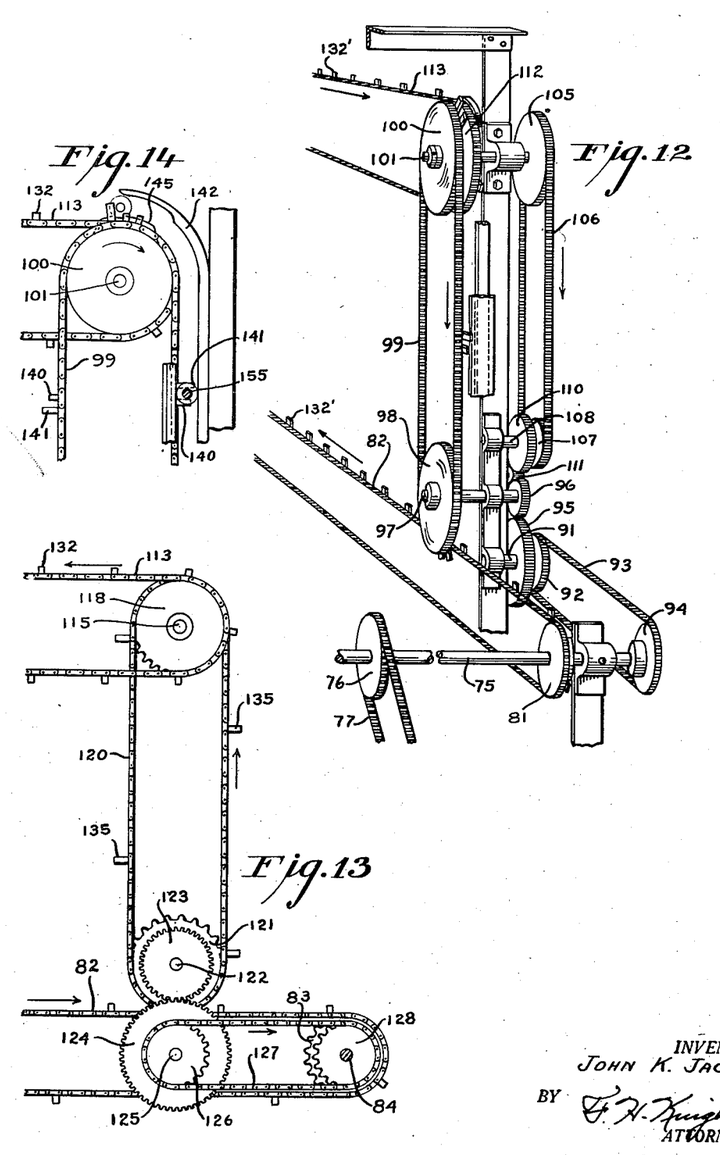
Fig. 12 is a perspective view illustrating the chain drive arrangement at the end of the apparatus at which power is supplied.
Fig. 13 is a side elevational view illustrating the linkage between chains at the end of the apparatus opposite which power is supplied.
Fig. 14 is a side elevation of a fragment of the apparatus of Fig. 12 where transfer of ware from one set of chains to another occurs.

Shafts 101 adjacent their idler sprocket wheels 100 have keyed thereto sprocket wheels 112 for driving conveyor chains 113 which, in a similar fashion to chains 82, extend to the other end of the machine where they surround idler sprocket wheels 114 (Fig. 7) carried by stub shafts 115, and are also provided with slack take-up devices such as already described. Other sprocket wheels 118 (Fig. 13) carried by shafts 115 carry conveyor chains 120 which are driven by sprocket wheels carried by stub shafts 122. As best shown in Fig. 13, each of these shafts carries a pinion 123 in mesh with a gear 124 carried by a stub shaft 125 provided with a sprocket wheel 126 driven by a chain 127 which passes over a sprocket wheel 128 carried by the stub shaft 84 which is being driven by one of the conveyor chains 82. The chains 82 and 113 are merely required to push the ware carrying rods along on their associated tracks 130 and 131 (Figs. 5, 6, 6a and 7) on which the rollers 56 of such rods rest and for this purpose are provided with suitably spaced fingers 132' and 132.

Chains 120 are provided with fingers 135 by means of which they can convey and transfer rods 55 to tracks 131 and can also lift rods from tracks 130 (Fig. 7) and bring them into position for removal by an attendant. During transfer of a rod to tracks 131, intermediate tracks 136 cooperate with the rod rollers 56 to maintain the rods on the fingers. Owing to the space occupied by ware suspended when moving vertically, it is impossible to space fingers 135 in accordance with the spacing of those on chains 82 and 113. This is compensated for, however, by driving the chains 120 at such a speed with respect to the speed of chains 82 that all rods carried by chains 82 are picked up as they are advanced into the path of movement of fingers 135. The rate of movement of chains 113 with respect to that of chains 120 and the distribution of the fingers on the two sets of chains are such that fingers of chains 120 always deposit the rods on tracks 131 slightly in advance of approaching fingers 132 of chains 113. The latter fingers then function to advance the rods to convey the ware through the kiln.

The spaces between the fingers 132 of chains 113 are shown to be the same as the spacing between the fingers of chains 82, and accordingly the speed of movement of the ware through the kiln is the same as that of its return movement through the various baths. The time period of treatment in the kiln may, however, be modified by changing the drive connections between stub shafts 101 and 108 (Fig. 12) to speed up or slow down the rate of movement of chains 132 and appropriately respacing the fingers thereof.

At the exit end of the kiln chains 99 are (see Figs. 12 and 14) provided with fingers 140 corresponding to those with which chains 82 and 113 are provided as well as with fingers 141 similar to those of chains 120.

Each pair of fingers 140—141 are spaced to accommodate a rod 55 between them (Fig. 14). The chains 99, which travel at the same rate of speed as chains 120, are so arranged with respect to the fingers 132 of chains 113 that fingers of the latter chains bring a rod into the path of movement of the long fingers 141 which advance the rod forward and downward, the rod being prevented from rolling off the short fingers 140 by engagement of their rollers 56 with associated tracks 142. In order to make it unnecessary for the fingers 132 of chains 113 to be in an exact position with respect to fingers 140—141 at the point of transfer, cams 145 have been provided which enable fingers 132 to elevate the rods and give clearance for movement of fingers 132 and 140 under them.

As a rod is lowered the ware carried by it is lowered into the heating fluid in tank 17 (Fig. 6). Finally, when a rod is lowered below the end of tracks 142, its rollers 56 come to rest on tracks 130 and the ware is then advanced toward the right by fingers 132' of chains 82. As already mentioned and as will be fully described hereinafter, the ware is transferred from one fluid tank to another during its progress to the right. As a rod enters the path of movement of fingers 135 of chains 120 (Fig. 7) it is again carried upward toward the kiln. As the ware emerges from the bath, an attendant removes the ware and replaces it with a fresh piece to be tempered.

*Transfer of ware from one tank to another*

The transfer mechanisms at the junctions of the respective tank ends are mounted on stub shafts 150 (Figs. 8 and 9) and include transfer arm sprocket wheels 151 about which the chains 82 are held in driving relation by associated idler sprocket wheels 152. Gears 155 carried by stub shafts 150 at each of the transfer positions, except for the one intermediate the ends of tanks 17 and 18 (Figs. 8 and 9), are permanently held against rotation in any desired manner. The gears 155 at this particular position are arranged in fixed relation with a gear 156 which gear is in mesh with a sector gear 157 under the influence of an arm 158 having a roller cooperative with a cam 159 (Fig. 9) by which shifting of the gear is at times effected when special types of ware are being treated, as will be more fully described hereinafter; otherwise the gear is permanently held in a fixed position by the sector gear 157 by substitution of a circular disc 160 (Fig. 15) for the cam 159. In other words, if only certain forms of ware were to be treated, gears 155 at this particular location could as well also be permanently fixed against rotation as at the other positions.

Figure 15:
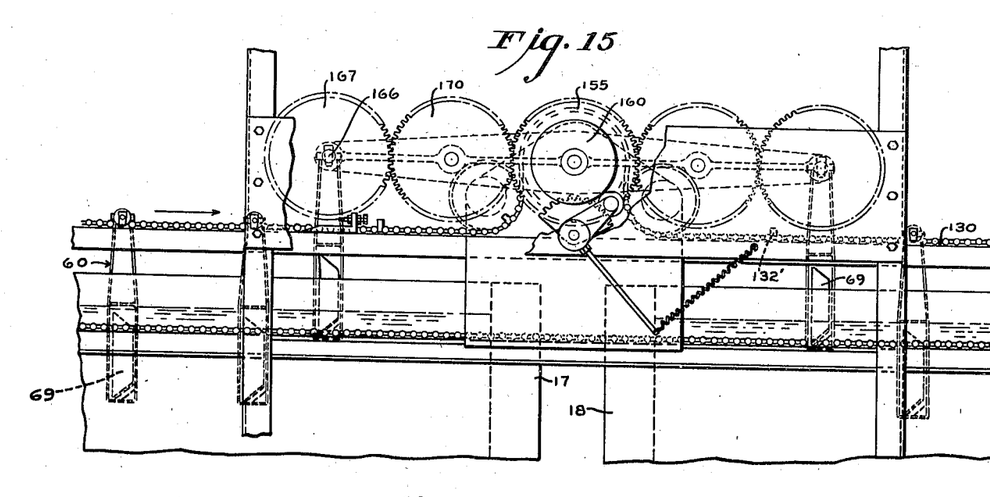
Fig. 15 is a view similar to Fig. 8, but modified to handle differently shaped ware.
Figure 15A:
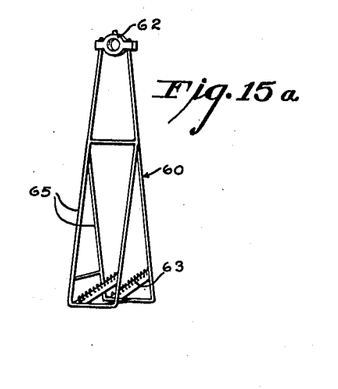
Fig. 15a is an enlarged perspective view of the form of ware rack illustrated as in use in Fig. 15.

Ware transfer arms 165 are carried by the shafts 150 and are in fixed relation to the driven sprocket wheels 151 so that such arms are rotated as the chains 82 advance the ware. The ends of arms 165 each have a stub shaft 166 which at one end carries a gear 167 and at the other end carries a hub 168 with a keyway 169 to accommodate the key 57 of a ware supporting rod 55 or, alternatively, the end of a rod on which no key is provided. Gears 170 carried by arms 165 are arranged intermediate gears 167 and 155 and in mesh therewith, with the net result that as arm 165 rotates, the gears 170 rotate about the gears 155 and in turn rotate gears 167 the proper amount to maintain hubs 168 in a position to receive and hold a key 157 in a vertical position, as illustrated in Figs. 8b and 17, while transferring ware from one bath to another. A rod 55 being advanced toward the end of a tank, tank 17 for example, is brought to a stop in the path of movement of hubs 168 by stop blocks 171 arranged in the path of movement of the rods. These blocks have a cam surface 172 and raise the rods sufficiently to allow fingers of chain 82 to start passing thereunder before lifting of the rod from the chain is fully effected. As illustrated in Fig. 15, as the transfer arms rotate they lift a piece of ware from the fluid in tank 17 while lowering a piece of ware into the fluid in tank 18, the rollers 56 of a rod being deposited on tracks 130 slightly in advance of a pair of fingers 132 which advance the ware toward the other end of tank 18. Subsequent transfer of the ware from one tank to another is carried out in like fashion.

The apparatus, as above described, is suitable for the form of hollow ware shown in racks 60 (Fig. 15), which has no recess in its side wall and is otherwise so shaped that it can be readily emptied by simply lifting a supporting rod assembly vertically and will have its entire surface covered when simply lowered into a chilling fluid.

When ware to be treated has a recessed side wall, the apparatus must be slightly modified to tilt the ware to fully empty it as it leaves the heating fluid, as the retention of such fluid in the ware will interfere with the proper chilling treatment and will also carry an excessive amount of the heating fluid over into the chilling bath. Also, it is essential to impart a special swinging movement to the ware as it is being immersed to avoid trapping air in the recessed portion of the ware which would prevent proper chilling of such portion.

To modify the apparatus to render it suitable for treatment of the latter defined form of ware, the disc 160 (Fig. 15) is removed from shaft 150 and cam 159 (Figs. 8, 8a and 9) substituted therefor. Also, a fixed cam 175 and an associated rod hold-down device 176 are provided at this transfer location.

The contour and setting of cam 159 is such that it becomes effective to rotate gears 155, 170 and 167 in a direction to effect rotation of hubs 168 a slight distance in a counterclock-wise direction as the ware is being lifted from the heating fluid and to rotate such gears in the reverse direction as the same end of the arm lowers the ware into the adjacent tank of chilling fluid to a position approximately that indicated in Fig. 11 as it deposits the ware carrying rod on tracks 130 immediately in front of a pair of the fingers 132', thereby replacing all air within the ware with chilling fluid. To hold the ware tilted long enough to assure filling it with fluid, the short length of cam track 175 is provided. This track is engaged by the key 57 of a rod before the ware has had time to swing back to the vertical position following its release from a hub 168 and prevents its return to its naturally suspended position during a short distance of travel through the chilling fluid. The hold-down track 176 cooperates with a rod roller 56 to prevent the rod from raising off the track while held in the rotated position by cam track 175. Obviously, only one end of the ware transfer arm can be properly controlled by cam 159 and accordingly when such cam is used only the alternate positions of the conveyor chains from which the properly controlled arm picks up rods are fed ware to be processed in this fashion. Subsequent steps of the treatment are identical to those already described.

It is believed clear from the foregoing that ware from stock, being at room temperature, is deposited in racks suspended from rods at the time on up-moving fingers 135 of chains 120 (Fig. 7) at the right hand end of the machine and accordingly passes through the kiln before passing through the respective fluid baths, whereas ware taken from a line of production may be deposited in racks suspended from rods at the time on downwardly moving fingers 140 (Fig. 6) of chains 99, thereby omitting the reheating step performed by the kiln. As will be evident, treated ware is in all instances removed from the racks at substantially the point at which ware from stock is loaded into the racks.

I claim:

1. A glassware tempering apparatus which includes means for suspending a piece of previously heated ware, means for lowering the suspending means into a tempering bath, means for tilting the suspending means as it is being lowered into the bath, means for moving the suspending means horizontally through the bath, and means for maintaining the suspending means in such tilting position during a predetermined portion of such movement.

2. In a glassware tempering apparatus, two tanks of fluid, a ware support, means for transferring said support from one tank to another, means for imparting a tilting movement to said support during its transfer, means for then moving said support horizontally through the fluid to which it has been transferred, and means for holding the support in the tilted position to which it has been moved by said second means during a portion of said horizontal movement.

JOHN K. JACKSON.